(12) United States Patent
Bayer et al.

(10) Patent No.: US 8,606,648 B1
(45) Date of Patent: Dec. 10, 2013

(54) SYSTEM AND METHOD FOR DETERMINING POTENTIAL FOR CURBSTONING AND GENERATING AN ADVISORY

(75) Inventors: Gerald A. Bayer, Scottsdale, AZ (US); David L. Silversmith, Burke, VA (US)

(73) Assignee: Carfax, Inc., Fairfax, VA (US)

( * ) Notice: Subject to any disclaimer, the term of this patent is extended or adjusted under 35 U.S.C. 154(b) by 2523 days.

(21) Appl. No.: 10/831,356

(22) Filed: Apr. 26, 2004

Related U.S. Application Data (60) Provisional application No. 60/527,019, filed on Dec. 5, 2003.

(51) Int. Cl.
*G06Q 30/00* (2012.01)
*G06Q 99/00* (2006.01)

(52) U.S. Cl.
USPC ............ 705/26.61; 705/26.35; 705/27.1; 705/317

(58) Field of Classification Search
USPC .................... 705/26.61, 26.35, 27.1, 317
See application file for complete search history.

(56) References Cited

U.S. PATENT DOCUMENTS

| | | |
|---|---|---|
| 4,989,144 A | 1/1991 | Barnett, et al. |
| 5,127,005 A | 6/1992 | Oda et al. |
| 5,598,511 A | 1/1997 | Petrinjak et al. |
| 5,899,985 A | 5/1999 | Tanaka |
| 6,052,631 A | 4/2000 | Busch et al. |
| 6,098,061 A | 8/2000 | Gotoh et al. |
| 6,259,354 B1 | 7/2001 | Underwood et al. |
| 6,397,131 B1 | 5/2002 | Busch et al. |
| 6,505,106 B1 | 1/2003 | Lawrence et al. |
| 7,113,853 B2 * | 9/2006 | Hecklinger .......... 701/35 |
| 2002/0194051 A1 | 12/2002 | Hall et al. |

OTHER PUBLICATIONS www.kbb.com, "Kelley Blue Book," Advice, New Car Values/Used Car Values, date printed Jul. 12, 2004.
www.kbb.com, "Kelley Blue Book," Condition Quiz—Appraise Your Own Vehicle, 2002 BMW 7 Series 745Li Sedan 4D, date printed Jun. 10, 2003.
www.kbb.com, "Kelley Blue Book," Blue Book Trade-In Report, 2002 BMW 7 Series 745Li Sedan 4D, date printed Jun. 10, 2003.
www.kkb.com, "Kelley Blue Book, Trade-In," 2002 BMW 7 Series 745Li Sedan 4D, date printed Jun. 10, 2003.
www.edmunds.com, "Certified Pre-Owned Cars," date printed Jul. 12, 2004.
auto.consumerguide.com, "The Truth About Cars," date printed Jun. 10, 2003.
"Powered by Intelliprice," 2001 BMW 7 Series 4D Sedan 740iL, Describe the condition of your vehicle, p. 1 of 1, date printed Jun. 10, 2003.

(Continued)

*Primary Examiner* — Paul R Fisher
(74) *Attorney, Agent, or Firm* — Baker & Hostetler LLP (57) ABSTRACT

A vehicle history information system and a method for determining the potential for curbstoning. In one embodiment, the vehicle history information system includes a vehicle history database with at least one vehicle history dataset related to a particular vehicle, the vehicle history dataset having at least one vehicle history record regarding the particular vehicle, and a record analysis module adapted to analyze the vehicle history dataset of the particular vehicle to determine whether there is a potential for curbstoning the particular vehicle based on the vehicle history record. In one implementation, the vehicle history record is an auto auction record which may indicate a sale of the particular vehicle and/or an offer for sale of the particular vehicle.

39 Claims, 5 Drawing Sheets

(56) References Cited

OTHER PUBLICATIONS www2.nadaguides.com, "Build and Price a New Car," Vehicle Report, pp. 1 of 2, date printed Jul. 12, 2004.
www.intellichoice.com, "2000 Mercury Mystique—At a Glance," Vehicle Report, pp. 1 of 2, date printed Jul. 14, 2004.
www.autocheck.com, "AutoCheck Vehicle History Reports: Free VIN Check," p. 1 of 1, date printed Jul. 14, 2004.
www.autocheck.com, "Welcome to AutoCheck," pp. 1 of 4, date printed Jul. 12, 2004.
www.autocheck.com, "Sample Reports," An AutoCheck Clean Bill of Health: 2G1WL54T4L9101564, 1990 Chevy Lumina, pp. 1 of 3, date printed Jul. 12, 2004.
www.autotrader.com, "Used Cars, Sell Your Car, Auto Financing & Insurance," p. 1 of 1, date printed Jul. 12, 2004.
www.cars.com, "Listings and research to connect you with the right car," pp. 1 of 2, date printed Jul. 12, 2004.
www.carmax.com, "The Online Auto Superstore" Home Page, p. 1 of 1, date printed Jul. 12, 2004.
www.dchusedcars.com, "DCH Auto Group, Used Car CyberLot of New Jersey—Freehold, New Jersey," Certifications, pp. 1 of 3, date printed Jul. 15, 2004.
www.autos.yahoo.com, "New car prices, car pictures, car reviews, used cars, used car prices on Yahoo!," pp. 1 of 3, date printed Jul. 15, 2004.
www.carprices.com, "Car Prices, New car prices, Used car prices, Auto financing and car research," pp. 1 of 2, date printed Jul. 15, 2004.
www.inventory.carprices.com, Match Maker, p. 1 of 1, date printed Jun. 23, 2003.
www.mbusa.com, "Find Starmark Certified pre owned Mercedes-Benz cars at mbusa.com," p. 1 of 1, date printed Jul. 15, 2004.
www.autoweb.com, "Used Cars for Sale, New Car Pricing by Autoweb/New and Used Car Prices/Autoweb," pp. 1 of 2, date printed Jul. 15, 2004.
www.car.com, "Building New Roads for the Automotive Community," pp. 1 of 2, date printed Jul. 15, 2004.
www.carsmart.com, "New and Used Car Prices," pp. 1 of 2, date printed Jul. 14, 2004.
www.dealernet.com, "The Key to Your Car, Welcome to Dealernet Prices and Reviews," p. 1 of 1, date printed Jul. 15, 2004.
www.autobytel.com, "Research," pp. 1 of 2, date printed Jul. 15, 2004.
www.cartrackers.com, "New and Used Car Pricing and Reviews," p. 1 of 1, date printed Jul. 15, 2004.
www.dealerhg.com, "Front Page," p. 1 of 1, date printed Jul. 15, 2004.
www.carfax.com, "Don't buy a used car without CARFAX!," p. 1 of 1, date printed Nov. 8, 2004.
www.carfax.com, "CARFAX Vehicle History Report," pp. 1-9, date printed Nov. 8, 2004.

\* cited by examiner

*This CARFAX Vehicle History Report was ran on June 12$^{th}$ 2003*

150

CARFAX searched over 2.16 billion records from nearly 800 sources and found 6 record(s) for this 1997 NISSAN SENTRA XE/GXE (3N1AB41DXVL01XXX).

| Date: | Odometer Reading: | Source: | General Comments: |
|---|---|---|---|
| 03/01/1997 | | Connecticut Motor Vehicle Dept. | Registered as commercial vehicle |
| 04/29/1997 | 10 | Connecticut Motor Vehicle Dept. Barrington, IL Title #023467301 | Title issued First owner reported |
| 04/15/1998 | | Connecticut Inspection Station | Passed emissions inspection |
| 06/26/2000 | 18,000 | Connecticut Inspection Station | Passed emissions inspection |
| 05/02/2002 | 37,000 | Connecticut Inspection Station | Passed emissions inspection |
| 04/30/2003 | 49,182 | Auto Auction | Sold at auction in New England Region Listed as a fleet vehicle |
| 06/12/2003 | | CARFAX Advisor | Be sure to buy this vehicle from a licensed dealer. A curbstoner is a person who purchases vehicles at volumes that require a dealer license and then poses as a private seller to sell to unsuspecting buyers for a large profit. Curbstoning is illegal in most States |

- Curbstoners use classified ads or put the vehicles in highly trafficked areas with "for sale" signs to attract unsuspecting buyers. If you are meeting the seller in a parking lot, be wary. They usually will not meet you at their homes.

- Look at the seller's license and the car's title. If the names on the two documents don't match, don't buy the car. Selling it for a friend or family member should send up red flags.

- Check the phone number. If the same phone number appears in multiple classified advertisements, the seller is probably curbstoning.

- Check the CARFAX Vehicle History Report for problem titles, odometer rollbacks, accidents and other automotive events.

- Take the car to a trusted mechanic for a pre-purchase inspection.

- Protect yourself from curbstoning by using CARFAX Find a Car or working with CARFAX Certified Dealers.

Figure 5

SYSTEM AND METHOD FOR DETERMINING POTENTIAL FOR CURBSTONING AND GENERATING AN ADVISORY

This application claims priority to U.S. Provisional Application No. 60/527,019, filed Dec. 5, 2003, the contents of which are incorporated herein by reference.

BACKGROUND OF THE INVENTION

1. Field of the Invention

The present invention is directed to a system and method for generating information regarding a vehicle. In particular, the present invention is directed to such a system and method that determines if there is a potential for curbstoning, and provides an advisory regarding a vehicle warning of the potential for curbstoning, if appropriate.

2. Description of the Related Art

The automotive industry is perhaps one of the largest industries in many industrialized regions of the world. As a result, the market for used vehicles has evolved into a substantial market, especially in North America, and in particular, the United States and Canada.

Those parties involved in the trading of used vehicles recognize the value of information relating to the used vehicle's history in making a purchasing decision including determining a value of the particular vehicle. Consequently, services have been created that function primarily to provide vehicle history information to various parties in the used vehicle market, including dealers and individual consumers. For example, Carfax, Inc., the assignee of the present invention, provides a variety of vehicle history information to both buyers and sellers of vehicles. In particular, Carfax, Inc. offers a web site at www.carfax.com, permitting a potential buyer or seller of a vehicle to purchase a vehicle history report containing an extensive collection of information regarding a particular vehicle. The vehicle history report may include such vehicle history information as model year, odometer readings, as well as vehicle history events such as accident information, the existence of salvage and/or flood titles, and maintenance records.

The profits that can be made in reselling of automobiles is very high, often higher than in selling of new vehicles. Consequently, unscrupulous people including dealers, engage in unethical or even fraudulent practices to resell used vehicles for significant profit. One type of unethical and fraudulent practice in the automotive sales industry is known as curbstoning. Curbstoning involves licensed vehicle dealers who purchase vehicles, for example, from auctions, and then sell the vehicles (either directly or through an unlicensed agent), posing as private sellers, without disclosing that the seller is a dealer, that the vehicle is owned by a dealer, or that the vehicle was purchased through an auction. Curbstoning is illegal in most states of the United States. In addition, these deceptive and fraudulent sellers frequently sell vehicles that reputable dealers would not sell due to hidden problems that affect both the vehicle's safety and resale value.

Unfortunately, it is very difficult for unaware consumers to identify a vehicle being sold by a potential curbstoner just from viewing the vehicle's history records such as those provided by vehicle history information services. The ability to identify a vehicle being sold by a potential curbstoner increases somewhat when the buyer meets the seller to consummate the transaction. However, such detection is difficult and varies widely depending on the perceptiveness of the buyer and the information provided by the seller. Most consumers are unaware of the fraudulent activity when participating in a vehicle sale transaction.

Presently available vehicle history information services and systems for providing such vehicle history information do not determine whether there exists a potential for curbstoning, and do not provide any guidance to the potential buyer in this regard. Therefore, there exists an unfulfilled need for a system and method for providing vehicle history records that improves the quality and quantity of vehicle history information provided to a consumer or an automotive professional. There also exists an unfulfilled need for a system and method for determining when there is a potential for curbstoning. Further, there also exists an unfulfilled need for such a system and method for generating an advisory regarding a vehicle which warns a potential buyer of the possibility of curbstoning when potential for curbstoning is present.

SUMMARY OF THE INVENTION

The primary purpose of the present invention is to improve the quality and quantity of vehicle history information provided to a consumer or an automotive professional.

One aspect of the present invention is a system and method for determining whether there is a potential for illegal curbstoning by the seller of the vehicle.

Another aspect of the present invention is a system and method that generates an advisory regarding a particular vehicle which warns a potential buyer of the possibility of curbstoning by the seller.

In the above regard, the system and method of the present invention alerts a prospective used car buyer that, based on the vehicle's history, there is a possibility of curbstoning if the seller of the vehicle represents him/herself as not being a dealer.

In accordance with one aspect of the present invention, a vehicle history information system for determining the potential for curbstoning is provided, the system comprising a vehicle history database including at least one vehicle history dataset related to a particular vehicle, the vehicle history dataset having at least one vehicle history record regarding the particular vehicle, and a record analysis module adapted to analyze the vehicle history dataset of the particular vehicle to determine whether there is a potential for curbstoning the particular vehicle based on the vehicle history record. In this regard, in one embodiment, the vehicle history record is an auto auction record which may indicate a sale of the particular vehicle and/or an offer for sale of the particular vehicle.

In accordance with another embodiment, the record analysis module is further adapted to determine whether the vehicle history record of the particular vehicle indicates a record date that is within a predetermined time period of an analysis date on which the vehicle history dataset of the particular vehicle is analyzed. In this regard, the record analysis module may be adapted to determine that there is the potential for curbstoning of the particular vehicle if the vehicle history record indicates a record date that is within the predetermined time period. In one implementation, the predetermined time period may be less than 90 days, for example, approximately 60 days.

In accordance with still another embodiment of the present invention, the system further includes a user interface module adapted to generate an advisory that warns of the potential for curbstoning if the record analysis module determines that there is the potential for curbstoning of the particular vehicle. In one implementation, the user interface module is adapted to display the advisory that is generated, the advisory including hyperlinks to additional information regarding curbstoning. In accordance with anther implementation, the user interface module may be further adapted to generate a vehicle history report that provides information regarding the particular vehicle based on the vehicle history dataset of the particular vehicle. In this regard, the user interface module may be further adapted to incorporate the generated advisory into the vehicle history report.

In accordance with another embodiment of the present invention, a vehicle history information system is provided for determining the potential for curbstoning, the system comprising a vehicle history database including at least one dataset related to a particular vehicle, the vehicle history dataset having an auto auction record which indicates a sale of the particular vehicle and/or an offer for sale of the particular vehicle, a record analysis module adapted to determine whether the auto auction record indicates a record date that is within a predetermined time period of an analysis date on which the auto auction record of the particular vehicle is analyzed, and a user interface module adapted to generate an advisory that warns of a potential for curbstoning if the auto auction record indicates a record date that is within the predetermined time period.

In accordance with another aspect of the present invention, a method for determining the potential for curbstoning is provided comprising the steps of providing a vehicle history information system including a vehicle history database having a vehicle history dataset related to a particular vehicle, the vehicle history dataset having at least one vehicle history record regarding the particular vehicle, and determining whether there is a potential for curbstoning of the particular vehicle based the vehicle history record. In accordance with one embodiment of the present method, the vehicle history record is an auto auction record which indicates a sale of the particular vehicle and/or an offer for sale of the particular vehicle.

In accordance with another embodiment, the method further includes the step of determining whether the vehicle history record indicates a record date within a predetermined time period of an analysis date on which the vehicle history record is analyzed. The method may further include the step of determining that there is potential for curbstoning if the vehicle history record indicates a record date within the predetermined time period. In one implementation, the predetermined time period may be less than 90 days, for example, approximately 60 days.

In accordance with another embodiment, the method may further include the step of generating an advisory that warns of the potential for curbstoning of the particular vehicle. In this regard, the method may further include the step of displaying the generated advisory, the advisory including hyperlinks to additional information regarding curbstoning. The method may further include the steps of generating a vehicle history report that provides vehicle history information associated with the particular vehicle, and incorporating the advisory into the vehicle history report.

In accordance with yet another embodiment of the present invention, a method for determining the potential for curbstoning is provided, the method comprising the steps of providing a vehicle history information system including a vehicle history database with at least one vehicle history dataset regarding a particular vehicle, the vehicle history dataset having an auto auction record which indicates a sale of the particular vehicle and/or an offer for sale of the particular vehicle, determining whether the auto auction record indicates a record date that is within a predetermined time period of an analysis date on which the auto auction record of the particular vehicle is analyzed, and generating an advisory that warns of a potential for curbstoning of the particular vehicle if the auto auction record indicates a record date that is within the predetermined time period.

In accordance with still another aspect of the present invention, a computer readable medium for determining the potential for curbstoning is provided, the medium comprising instructions for parsing a vehicle history database having a vehicle history dataset related to a particular vehicle, the vehicle history dataset having at least one vehicle history record regarding the particular vehicle, and instructions for determining whether there is a potential for curbstoning of the particular vehicle based the vehicle history record. In accordance with one implementation, the vehicle history record may be an auto auction record that indicates a sale of the particular vehicle and/or an offer for sale of the particular vehicle.

In accordance with one embodiment, the medium may further include instructions for determining whether the vehicle history record indicates a record date within a predetermined time period of an analysis date on which the vehicle history record is analyzed. In this regard, the predetermined time period may be approximately 60 days. In accordance with another embodiment, the medium further includes instructions for generating an advisory that warns of the potential for curbstoning, and may further include instructions for displaying the advisory. The medium may also include instructions for generating a vehicle history report that provides vehicle history information associated with the particular vehicle, and incorporating the advisory into the vehicle history report.

In accordance with yet another embodiment of the present invention, a medium for determining the potential for curbstoning is provided, the medium comprising instructions for parsing a vehicle history database including at least one vehicle history dataset regarding a particular vehicle, the vehicle history dataset having an auto auction record which indicates a sale of the particular vehicle and/or an offer for sale of the particular vehicle, instructions for determining whether the auto auction record indicates a record date that is within a predetermined time period of an analysis date on which the auto auction record of the particular vehicle is analyzed, and instructions for generating an advisory that warns of a potential for curbstoning if the auto auction record indicates a record date that is within the predetermined time period.

These and other advantages and features of the present invention will become more apparent from the following detailed description of the preferred embodiments of the present invention when viewed in conjunction with the accompanying drawings.

DETAILED DESCRIPTION OF THE PREFERRED EMBODIMENT

As will be evident from the detailed discussion below, the system and method of the present invention improves the quality and quantity of vehicle history information that is provided to a consumer or an automotive professional. In particular, the present invention utilizes vehicle history records as provided by a vehicle history system to determine whether there is a risk of, potential for, or likelihood of curbstoning of a vehicle being analyzed by the system and method of the present invention, for example, to provide a vehicle history report. In addition, the present invention generates an advisory regarding the vehicle being analyzed which warns a potential buyer of the vehicle of the possibility of curbstoning, if appropriate.

Figure 1:
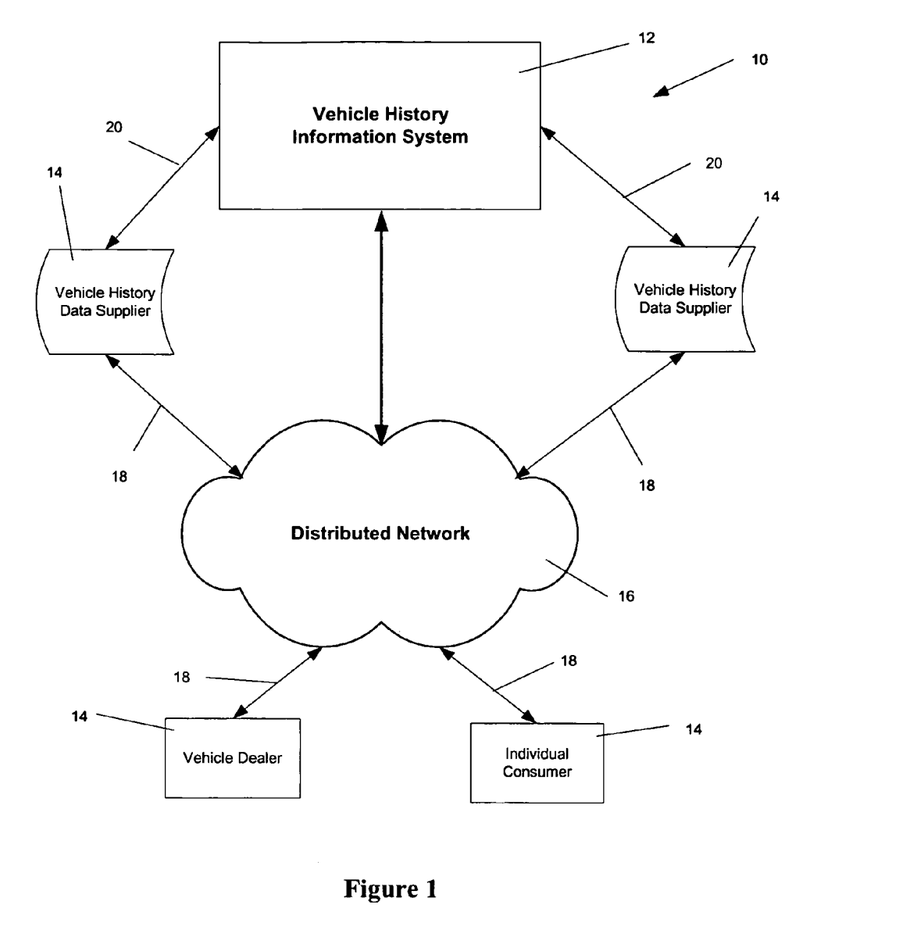
FIG. 1 is a general schematic illustration of a vehicle history information system in accordance with one embodiment of the present invention connected to various terminals and a distributed network.

Referring to the drawings, FIG. 1 is a highly schematic diagram of a system, for example in the form of a computer network 10, designed to implement the subject invention. FIG. 1 may also be viewed as showing the relationship of the different entities potentially involved in the application of one embodiment of the present invention. Specifically, a computer implemented vehicle history information system 12 exchanges data with a plurality of remote terminals 14 through data transmission across a distributed network 16, e.g. Internet. The terminals 14 represent individual consumers and vehicle dealers accessing vehicle history information system 12 to obtain vehicle history information about a particular vehicle. Terminals 14 may also include vehicle history data sources or suppliers which are used by the vehicle history information system administrator to create and update vehicle history information in system 12. The vehicle history data suppliers may include individual consumers, vehicle dealers, state titling offices, Department of Motor Vehicles, auto auctions and any other source of vehicle information.

The distributed network 16 may be any type of communications channel such as a local area network (LAN), wide area network (WAN), direct computer connections, and/or wireless connections using radio frequency, infrared, or other wireless technologies using any appropriate communication hardware and protocols, and may further be the Internet. Thus, terminals 14 may be connected to distributed network 16 by any conventional communication links 18, including via hardwire and/or in a wireless manner. Moreover, the vehicle history data suppliers may provide information to vehicle history information system 12 via any means of effectively communicating vehicle history information, including conventional telephone, facsimile and/or mail services.

Figure 2:
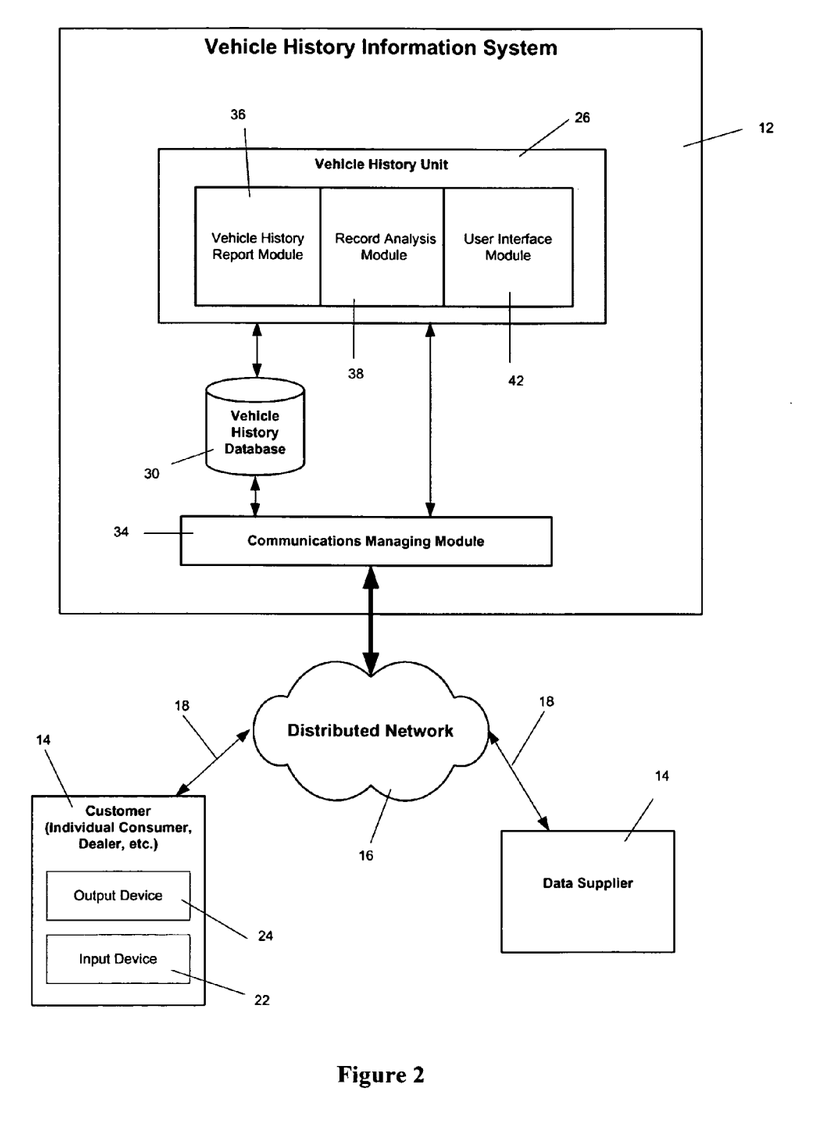
FIG. 2 is a detailed schematic illustration of the vehicle history information system in accordance with one implementation of the present invention.

FIG. 2 illustrates in more detail, the vehicle history information system 12 in accordance with one embodiment of the present invention. Generally, vehicle history information system 12 may be implemented with any type of appropriate hardware and software, with portions residing in the form of computer readable storage medium having executable instructions, and computer architecture as discussed hereinbelow. Vehicle history information system 12 may be implemented using a server, personal computer, a portable computer, a thin client, etc. or any combination of such devices. In this regard, vehicle history information system 12 may be a single device at a single location as shown, or multiple devices at a single, or multiple locations that are connected together using any appropriate communication protocols over any communication medium such as electric cable, fiber optic cable, any other cable, or in a wireless manner using radio frequency, infrared, or other technologies.

FIG. 2 also illustrates in more detail, the preferred implementation of the terminals 14. Although only one terminal is shown in detail as the customer terminal, which may include the individual consumers and vehicle dealers of FIG. 1, the details of the customer terminal 14 are equally applicable to the data supplier terminal and all other terminals. Terminal 14 may be any appropriate device for accessing vehicle history information system 12 such as a personal computer, portable computer, thin client, a handheld device such as a mobile phone or PDA, and the like. Terminal 14 includes an input device 22 and an output device 24 which allow the user of the terminal 14 to provide information to, and receive information from, vehicle history information system 12 via the distributed network 16. In this regard, the input device 22 may include a keyboard, mouse, etc. as well as data input devices such as memory devices based on magnetic, optical and/or solid state technologies including disc drives, CD/DVD drives, flash memory, etc. The output device 24 may include a monitor screen, printer, etc. that allow the user of the terminal 14 to obtain the vehicle history information from vehicle history information system 12.

Referring to FIG. 2, in the preferred embodiment, vehicle history information system 12 includes a vehicle history unit 26, a vehicle history database 30, and a communications managing module 34, all of which are connected together for effective data communication. Vehicle history unit 26 in the embodiment shown includes a vehicle history report module 36, a record analysis module 38, and a user interface module 42, the functions of each being further described hereinbelow.

It should be noted that the vehicle history information system 12 and the vehicle history unit 26 in accordance with the embodiment of the present invention is illustrated and discussed herein as having various modules and units which perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Thus, the present invention as schematically embodied in FIG. 2 should not be construed to limit the vehicle history information system 12 of the present invention, but be understood to merely be a schematic example.

Vehicle history database 30 contains a plurality of datasets, each of which are related to a particular vehicle. Each dataset is preferably a comprehensive collection of vehicle history data arranged, organized, indexed and/or retrievable based on the unique vehicle identification number (VIN) of the particular vehicle. Each vehicle sold within the United States and most foreign countries has a unique VIN which is identified on nearly every vehicle title issued and physically identified on the respective vehicle. The VIN is the key to identifying and tracing the public record of each vehicle and to associating different vehicle data collected from a variety of sources with the correct particular vehicle. Thus, as used herein, the phrase "particular vehicle" refers to only one physical vehicle associated with a single VIN and does not refer to general model level information or categories of vehicles, for example, relating to a particular make, model and/or year.

As previously mentioned, the administrator of vehicle history information system 12 acquires vehicle history data from a variety of data suppliers 14. Each item of data acquired and entered into vehicle history database 30 is associated with a particular VIN and thus, a particular vehicle. The vehicle data is added as a record to vehicle history database 30 and indexed by the VIN, the cumulative data forming the dataset related to a particular vehicle. When a vehicle history report is requested as discussed hereinbelow, all records indexed by the same VIN, i.e. the vehicle history records of a vehicle history dataset, are selected.

Vehicle history database 30 may be any conventional database capable of effectively storing collections of records in an organized accessible manner to permit efficient easy access to desired pieces of data, i.e. one or more records, for example, vehicle history dataset associated with a particular VIN, using appropriate database management system software. Preferably, vehicle history database 30 receives information from, and may be accessed by, all components of vehicle history information system 12. The information stored in vehicle history database 30 as vehicle history records may include, for example, the VIN (which indicates make, model and year); accident information, such as salvage title, junk title, flood damage, fire damage, police accident report and damage disclosure information; mileage information, such as odometer problems and actual mileage listings; title/registration events including government registration, taxi registration and commercial registration; stolen vehicle information; fleet information; emissions and safety inspection information; recall information; sale information such as sale or offer for sale by an auction or a dealer; and any other information relevant to the vehicle's history. This information is preferably used to create corresponding vehicle records stored in the vehicle history database 30 and associated with a particular VIN for retrieval, processing and/or display.

In the preferred embodiment, a vehicle history unit 26 includes appropriate hardware and software for implementing the various modules necessary to perform the functions of the vehicle history information system 12 described herein, in particular, analyzing the vehicle dataset regarding a particular vehicle and providing the results of the analysis to the user of the vehicle history information system 12, for example, in a vehicle history report. Vehicle history unit 26 may be implemented as a general purpose computing device with a central processing unit (CPU) or processor. The software for operating the vehicle history unit 26 and of the various modules may reside in a computer readable storage medium in the form of encoded executable instructions for operating the system and performing the functionalities and process steps described herein.

Vehicle history report module 36 functions to access vehicle history database 30 and retrieve the appropriate vehicle history records of a vehicle history dataset associated with a particular vehicle being analyzed by the vehicle history information system 12 as identified by the user, for example, by providing a VIN. Thus, vehicle history report module 36 includes the appropriate software necessary to select the appropriate vehicle history records of a dataset from vehicle history database 30 based on a particular request, i.e. VIN. Vehicle history report module 36 may further be adapted to arrange and organize the vehicle history records and information in a manner appropriate for further data processing, analysis and/or display.

As previously noted, it is very difficult for consumers to identify a vehicle being sold by a potential curbstoner merely from viewing the vehicle's history records, and most consumers are unaware of the fraudulent activity when participating in a vehicle sale transaction. Thus, record analysis module 38 in accordance with the illustrated embodiment examines the vehicle history records retrieved by vehicle history report module 36 and analyzes these records to determine whether potential for such curbstoning is present, i.e. whether such risk or likelihood of curbstoning exists. This determination by record analysis module 38 allows generation of an advisory by the user interface module 42 which warns a potential buyer that potential for curbstoning is present and that the vehicle the buyer is considering should only be sold by a professional, licensed dealer.

User interface module 42 of the vehicle history unit 26 is adapted to utilize the information provided by the vehicle history report module 36 to generate a user interface for delivery to output device 24 of customer terminal 14. In addition, user interface module 42 is adapted to generate particular electronically displayable files for delivery to, and display by, output device 24 of customer terminal 14. For example, the electronically displayable files may provide a vehicle history report of the particular vehicle being analyzed based on the retrieved vehicle history records from the vehicle history database 30. The user interface module 42 may further generate an advisory which warns of the potential for curbstoning of the particular vehicle being analyzed based on the retrieved vehicle history records as determined by the record analysis module 38, if applicable. Communications managing module 34 is adapted to manage communications and interactions between vehicle history information system 12 and its various components, and with the various terminals 14 via the distributed network 16.

In the above regard, record analysis module 38 of vehicle history unit 26 may be adapted to examine and analyze the vehicle history dataset related to the particular vehicle being analyzed by the vehicle history information system 12 to determine potential for curbstoning in various ways. However, in accordance with the present embodiment, a vehicle history record indicating sale of the vehicle, or offer of sale of the vehicle, by an auto auction is used to determine the potential for curbstoning, i.e. risk or likelihood of such curbstoning activity. Specifically, used vehicles can only be purchased at remarketing auto auctions by licensed dealers. By identifying vehicle history records indicating that the vehicle being analyzed was sold, or offered for sale, at an auto auction, and analyzing these records as described below, the record analysis module 38 of the present invention can identify vehicles where potential curbstoning activity is present. The results of such analysis allows generation of an advisory warning for the potential used car buyer via the user interface module 42, if applicable.

Figure 3:
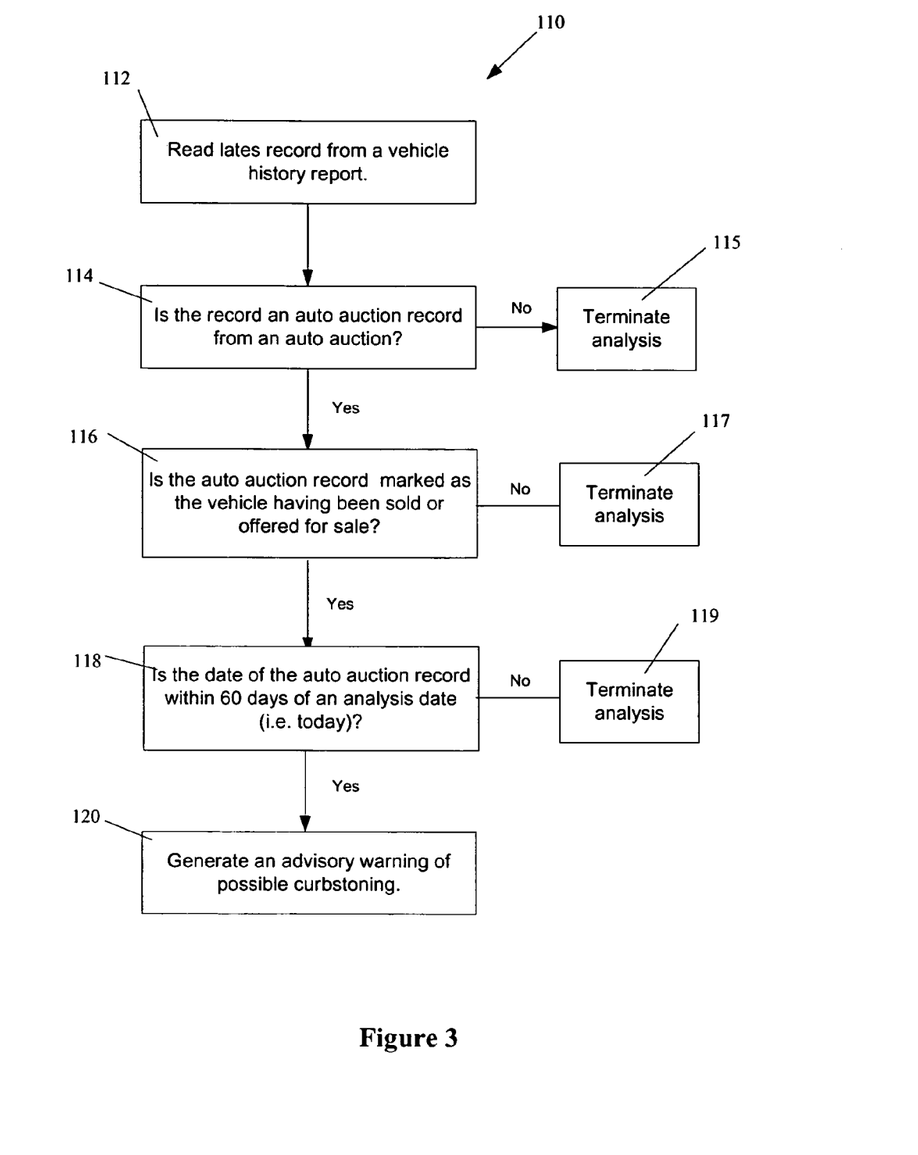
FIG. 3 is a flow diagram illustrating one example method in accordance with the present invention.

FIG. 3 is a flow diagram 100 illustrating one example method in accordance with the present invention which may be implemented by vehicle history unit 26, in particular, record analysis module 38, to determine whether potential for curbstoning is present for a particular vehicle being analyzed by the vehicle history information system 12. The method in accordance with the illustrated embodiment includes step 112 in which the latest (generally, the most recent) vehicle history record is read, for example, by the record analysis module 38. In the illustrated embodiment, the vehicle history record may be read from a vehicle history report which may be generated, for example, by the vehicle history report module 36, and provided to a potential buyer on a particular analysis date which corresponds to the date on which analysis of the vehicle history records regarding the particular vehicle is performed.

A determination is made in step 114 as to whether the vehicle history record read and being analyzed is from an auto auction, i.e. whether the vehicle history record is an auto auction record. If the vehicle history record is not an auto auction record, the analysis is terminated in step 115. If the record is from an auto auction, a determination is made in step 116 as to whether the auto auction record is marked as the vehicle having been sold, or being offered for sale. If the auto auction record does not provide such a marking, analysis is terminated in step 117. However, if the auto auction record indicates that the vehicle was sold or offered for sale in step 116, a determination is made in step 118 as to whether the record date of the auto auction record being analyzed is within a predetermined time period of the date of the analysis being performed, for example, within 60 days in the illustrated embodiment. For example, if vehicle history records were being analyzed in accordance with the described method today, the auto auction record is analyzed to determine whether the record is dated within 60 days of today. In other words, a determination is made as to whether the record indicating sale or offer for sale at an auction is dated within 60 days from the date on which the record is being analyzed, for example, the date of the vehicle history report.

If the date of the auto auction record is not within the predetermined time period, the analysis is terminated in step 119. However, if the date of the auto auction record is within the predetermined time period, for example, within 60 days of the date of the analysis such as generation of the vehicle history report, the potential for curbstoning is determined to be present and an advisory is generated in step 120 warning of the potential for curbstoning. The warning message may be any appropriate text, for example:

"CARFAX Advisor™: Be sure to buy this vehicle from a licensed dealer. A curbstoner is a person who purchases vehicles at volumes that require a dealer license and then poses as a private seller to sell to unsuspecting buyers for a large profit. Curbstoning is illegal in most States."

In the above regard, the predetermined time period utilized in step 116 of the flow diagram 110 is utilized so that an advisory is preferably not generated after this time period in the illustrated embodiment. Ideally, it would be desirable to generate an advisory, if appropriate, until the particular vehicle is sold. Such sale of the particular vehicle may be determined by identifying a vehicle history record indicating sale or titling of the vehicle to a consumer that is subsequent to the auction record. However, such vehicle history records can take up to several months to be entered in to the vehicle history database 30 for analysis and generation in a vehicle history report. Thus, the predetermined time period of 60 days, for example, may be used to limit the duration during which the advisory may be generated, if appropriate. Of course, the predetermined time period may be longer or shorter in other embodiments.

The above described method of flow diagram 100 provides a method for substantially automating the determination of whether there exists a potential for curbstoning for a particular vehicle. The method of the discussed embodiment of the present invention recognizes the fact that vehicle history information systems, such as vehicle history information system 12, are generally accessed and used in selling or buying a particular vehicle that is offered for sale, near the time of the potential sale or purchase. The present invention utilizes this fact to ascertain that if a particular vehicle is being offered for sale, as implied by the utilization of a vehicle history information system to obtain a vehicle history report regarding a particular vehicle, one or more vehicle history records may be utilized to determine the potential for curbstoning.

Such a determination capability also allows substantially automated generation of an advisory warning for the used car buyer which informs the potential buyer that there is a potential for curbstoning, i.e. that there is a risk and a likelihood that the seller is engaging in curbstoning, and that the particular vehicle the buyer is considering should only be sold by a professionally licensed dealer. In such an instance, if the seller denies being a dealer, or someone other than a licensed dealer is selling the vehicle, the potential buyer would know that curbstoning is likely being perpetrated and that the seller should be considered with suspicion.

It should further be noted that in the above discussed embodiment of FIG. 3, the vehicle history record that is analyzed by the record analysis module 38 to determine potential for curbstoning is an auto auction record. However, in other embodiments, the vehicle history record that is analyzed to determine potential for curbstoning may be another type of vehicle history record from the dataset related to the particular vehicle being analyzed which is indicative of curbstoning. For example, a vehicle history record indicating geographical location of the vehicle may be used, or the type of vehicle may be used if it is determined that certain type of vehicle is more prone to be curbstoned by the seller. However, auto auction records are especially indicative of potential for curbstoning since only dealers can legitimately purchase vehicles from auto auctions as previously explained.

Figure 4:
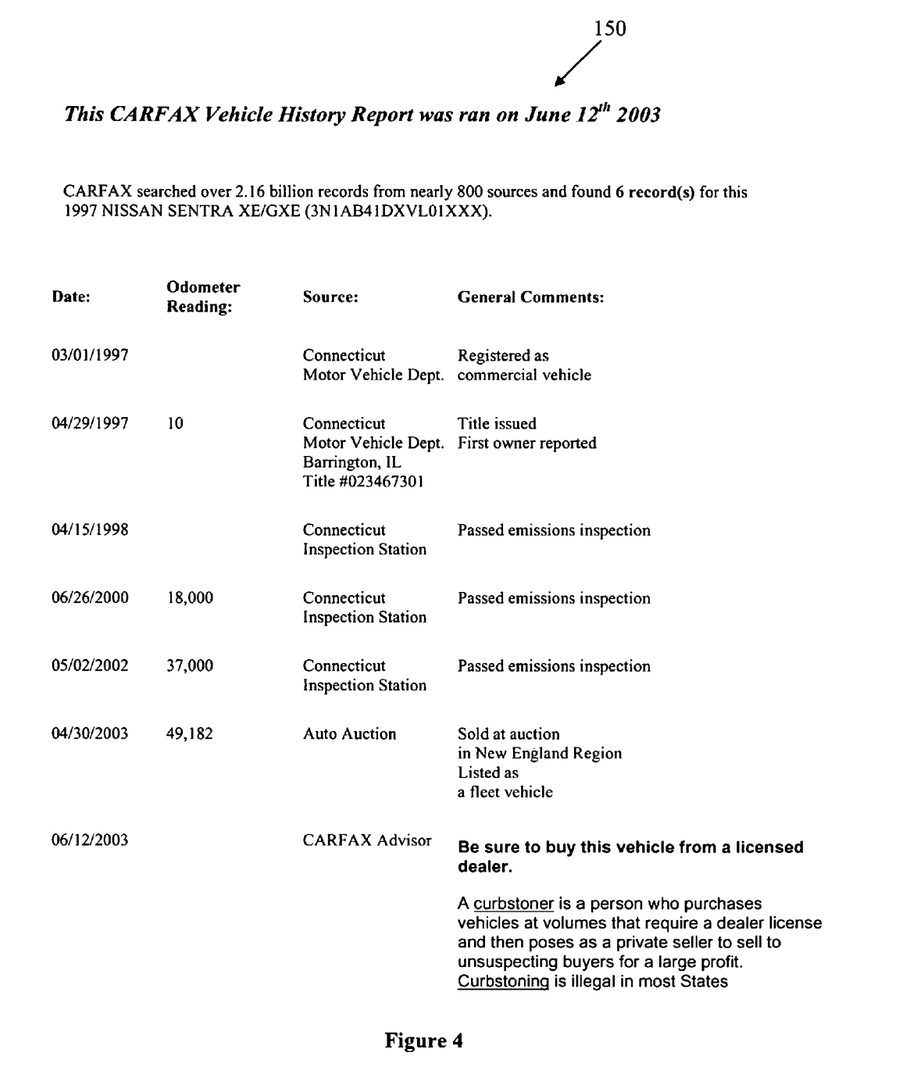
FIG. 4 shows example vehicle history records of a vehicle history report for a hypothetical vehicle in which an advisory is provided in accordance with the present invention.

FIG. 4 illustrates sample vehicle history records set forth in an example vehicle history report 150 for a hypothetical vehicle in which the analysis of the present embodiment is applied, and an advisory that is generated in accordance with the present invention. In particular, as can be seen, the vehicle history report 150 is generated on Jun. 12, 2003 which is the analysis date. On this analysis date, an advisory is generated and displayed in the vehicle history report 150 which sets forth the above described warning of the potential for curbstoning. This advisory entry is generated based on the fact that there was a vehicle history record from an auto auction on Apr. 30, 2003, this auto auction record being marked as the vehicle having been sold. This auto auction record occurred within 60 days of the date of the vehicle history report 150 in accordance with the method described above relative to FIG. 3. Thus, the advisory is generated to warn of the risk or potential that the seller is engaging in curbstoning since the vehicle is being offered for sale soon after purchase from the auto auction. Of course, in accordance with the present embodiment, if the date of the analysis was more than 60 days after the date of the auto auction record, an advisory would not be generated.

Figure 5:
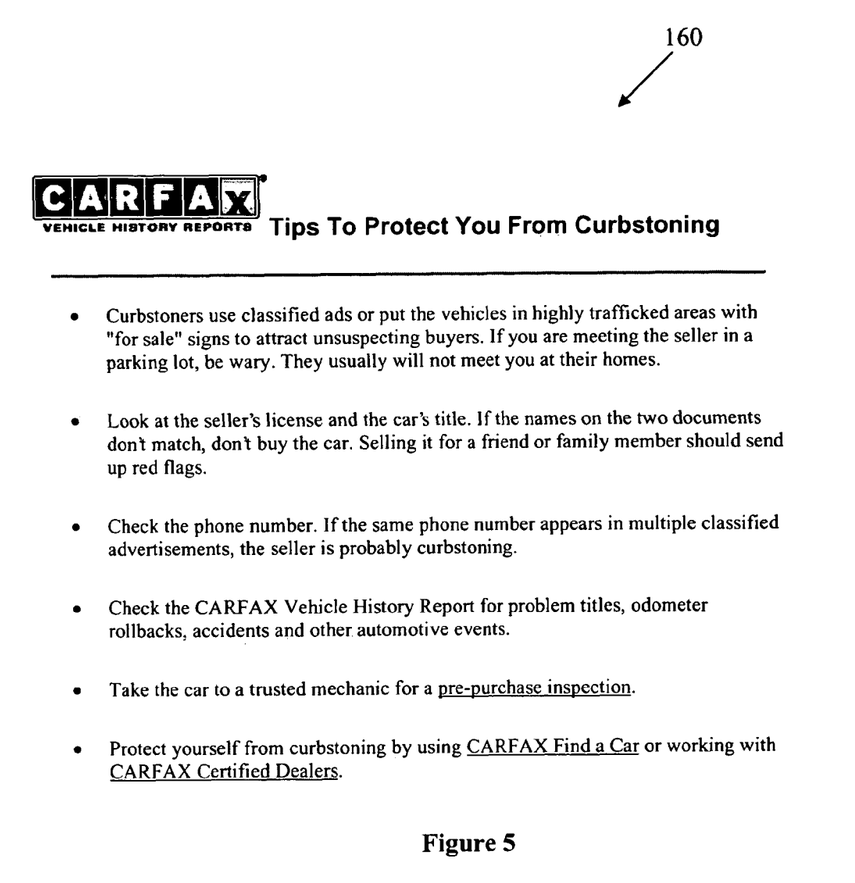
FIG. 5 a sample information page that further explains the advisory shown in FIG. 4 regarding curbstoning.

In addition, as can also be seen, the advisory of Jun. 12, 2003 in the vehicle history record 150 is also provided with hyperlink(s) "curbstoner" and "Curbstoning" which, when selected, causes the display of an information page that provides additional information regarding curbstoners and/or curbstoning to further educate the reader such as the potential buyer or automotive professional. In this regard, FIG. 5 illustrates an example information page 160 as implemented by Carfax, Inc. that further explains the advisory shown in FIG. 4 regarding curbstoning and provides various useful information for confirming whether the seller is engaging in curbstoning.

Thus, the system and method of the present invention as described above allows determination of possible curbstoning, and corresponding generation of an advisory that warns of possible curbstoning activity, if applicable. By providing an advisory in the manner described above, the system and method of the present invention also helps viewers of the vehicle history records or reports having such records, better understand the particular vehicle's history. The method and system of the present invention also provides contextual information inferred from the vehicle's known history directly within the vehicle history report and/or via hyperlinks so that the information is timely and convenient for use.

The present invention may be further modified to provide a different advisory that corresponds to different levels of potential for curbstoning. For example, different advisories may be generated based on presence of one or more additional vehicle history records that are also indicative of curbstoning. The presence of such records, for example, a vehicle history record indicating geographical location of the vehicle where curbstoning is known to be prevalent, or the type of vehicle known to be prone to curbstoning, may further increase the likelihood for curbstoning when present in conjunction with the auto auction record. Upon determination of the potential for curbstoning, an advisory which corresponds to the increased likelihood of curbstoning may be provided to the user so that if such additional vehicle history record(s) is present, a more strongly worded advisory may be generated. Moreover, graphics, animation, etc. may be used to emphasize the increased likelihood of curbstoning. For example, the advisory with flashing, red colored, warning text in large font size may be provided in those instances where more strongly worded advisory is provided.

In view of the above, it should now be evident that the system and method of the present invention improves the quality and quantity of vehicle history information provided to a consumer or an automotive professional. In particular, as described fully above, the present invention as implemented in the above described embodiment, utilizes vehicle history records as provided by the vehicle history system, to determine the potential for curbstoning, and to generate an advisory to warn a potential buyer of the risk and likelihood that the seller is engaging in curbstoning.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

The invention claimed is:

1. A vehicle history information system comprising:
   a vehicle history database including at least one vehicle history dataset related to a particular vehicle, said at least one vehicle history dataset having at least one vehicle history record regarding said particular vehicle; and
   a record analysis module adapted to analyze said at least one vehicle history dataset of said particular vehicle to determine whether there is a potential for curbstoning said particular vehicle based on said at least one vehicle history record.

2. The system of claim 1, wherein said at least one vehicle history record is an auto auction record.

3. The system of claim 2, wherein said auto auction record indicates at least one of a sale of said particular vehicle and an offer for sale of said particular vehicle.

4. The system of claim 1, wherein said record analysis module is adapted to determine whether a record date of said at least one vehicle history record of said particular vehicle is within a predetermined time period of an analysis date on which said at least one vehicle history dataset of said particular vehicle is analyzed.

5. The system of claim 4, wherein said record analysis module determines that there is the potential for curbstoning of said particular vehicle if said at least one vehicle history record indicates a record date that is within said predetermined time period.

6. The system of claim 5, wherein said predetermined time period is less than 90 days.

7. The system of claim 5, wherein said predetermined time period is approximately 60 days.

8. The system of claim 1, further including a user interface module adapted to generate an advisory that warns of the potential for curbstoning if said record analysis module determines that there is the potential for curbstoning of said particular vehicle.

9. The system of claim 8, wherein said user interface module is adapted to display said advisory.

10. The system of claim 9, wherein said advisory includes hyperlinks to additional information regarding curbstoning.

11. The system of claim 8, wherein said user interface module is further adapted to generate a vehicle history report that provides information regarding said particular vehicle based on said vehicle history dataset of said particular vehicle.

12. The system of claim 11, wherein said user interface module is further adapted to incorporate said advisory into said vehicle history report.

13. A vehicle history information system comprising:
   a vehicle history database including at least one dataset related to a particular vehicle, said at least one vehicle history dataset having an auto auction record which indicates at least one of a sale of said particular vehicle and an offer for sale of said particular vehicle;
   a record analysis module adapted to determine whether said auto auction record indicates a record date that is within a predetermined time period of an analysis date on which said auto auction record of said particular vehicle is analyzed; and
   a user interface module adapted to generate an advisory if said auto auction record indicates a record date that is within said predetermined time period.

14. The system of claim 13, wherein said user interface module is further adapted to display said advisory.

15. The system of claim 13, wherein said user interface module is further adapted to generate a vehicle history report, and to incorporate said advisory into said vehicle history report.

16. The computer-implemented method of claim 14, wherein said at least one vehicle history record is an auto auction record.

17. The computer-implemented method of claim 16, wherein said auto auction record indicates at least one of a sale of said particular vehicle and an offer for sale of said particular vehicle.

18. A computer-implemented method for determining the potential for curbstoning comprising the steps of:
   providing a vehicle history information system including a vehicle history database having a record analysis module and a vehicle history dataset related to a particular vehicle, said vehicle history dataset having at least one vehicle history record regarding said particular vehicle; and
   determining whether there is a potential for curbstoning of said particular vehicle based on said at least one vehicle history record, wherein the vehicle history information system determines whether there is the potential for curbstoning.

19. The computer-implemented method of claim 18, further including the step of determining whether said at least one vehicle history record indicates a record date within a predetermined time period of an analysis date on which said at least one vehicle history record is analyzed.

20. The computer-implemented method of claim 19, further including the step of determining that there is the potential for curbstoning if said at least one vehicle history record indicates a record date within said predetermined time period.

21. The computer-implemented method of claim 20, wherein said predetermined time period is less than 90 days.

22. The computer-implemented method of claim 20, wherein said predetermined time period is approximately 60 days.

23. The computer-implemented method of claim 18, further including the step of generating an advisory that warns of the potential for curbstoning of said particular vehicle.

24. The computer-implemented method of claim 23, further including the step of displaying said advisory.

25. The computer-implemented method of claim 24, wherein said advisory includes hyperlinks to additional information regarding curbstoning.

26. The computer-implemented method of claim 23, further including the steps of generating a vehicle history report that provides vehicle history information associated with said particular vehicle, and incorporating said advisory into said vehicle history report.

27. A computer-implemented method comprising:
providing a vehicle history information system including a record analysis module and a vehicle history database with at least one vehicle history dataset regarding a particular vehicle, said at least one vehicle history dataset having an auto auction record which indicates at least one of a sale of said particular vehicle and an offer for sale of said particular vehicle;
determining whether said auto auction record indicates a record date that is within a predetermined time period of an analysis date on which said auto auction record of said particular vehicle is analyzed, wherein the vehicle history information system determines whether the auto auction record is within the predetermined time period of the analysis date on which the auto auction record of the particular vehicle is analyzed; and
generating an advisory if said auto auction record indicates a record date that is within said predetermined time period, wherein the vehicle history information system generates the advisory.

28. The computer-implemented method of claim 27, further including the step of displaying said advisory.

29. The computer-implemented method of claim 27, further including the steps of generating a vehicle history report that provides vehicle history information associated with said particular vehicle, and incorporating said advisory into said vehicle history report.

30. A computer readable storage medium containing executable instructions which cause a data processing system to perform a method, the method comprising:

parsing a vehicle history database having a vehicle history dataset related to a particular vehicle, said vehicle history dataset having at least one vehicle history record regarding said particular vehicle; and
determining whether there is a potential for curbstoning of said particular vehicle based on said at least one vehicle history record.

31. The medium of claim 30, wherein said at least one vehicle history record is an auto auction record that indicates at least one of a sale of said particular vehicle and an offer for sale of said particular vehicle.

32. The medium of claim 31, further including instructions for determining whether a record date of said at least one vehicle history record is within a predetermined time period of an analysis date on which said at least one vehicle history record is analyzed.

33. The medium of claim 32, wherein said predetermined time period is approximately 60 days.

34. The medium of claim 30, further including instructions for generating an advisory that warns of the potential for curbstoning.

35. The medium of claim 34, further including instructions for displaying said advisory.

36. The medium of claim 34, further including instructions for generating a vehicle history report that provides vehicle history information associated with said particular vehicle, and incorporating said advisory into said vehicle history report.

37. A computer readable storage medium containing executable instructions which cause a data processing system to perform a method comprising:
parsing a vehicle history database including at least one vehicle history dataset regarding a particular vehicle, said at least one vehicle history dataset having an auto auction record which indicates at least one of a sale of said particular vehicle and an offer for sale of said particular vehicle;
determining whether said auto auction record indicates a record date that is within a predetermined time period of an analysis date on which said auto auction record of said particular vehicle is analyzed; and
generating an advisory if said auto auction record indicates a record date that is within said predetermined time period.

38. The medium of claim 37, further including instructions for displaying said advisory.

39. The medium of claim 37, further including instructions for generating a vehicle history report that provides vehicle history information associated with said particular vehicle, and incorporating said advisory into said vehicle history report.

* * * * *